(12) United States Patent
Dyal et al.

(10) Patent No.: US 12,723,674 B2
(45) Date of Patent: Sep. 1, 2026

(54) BACKWATER VALVE COVER SYSTEM

(71) Applicant: Radon Home Defence Inc., Stoney Creek (CA)

(72) Inventors: Christopher Dyal, Stoney Creek (CA); Bradley Goemans, Stoney Creek (CA)

(73) Assignee: Radon Home Defense Inc., Stoney Creek (CA)

( * ) Notice: Subject to any disclaimer, the term of this patent is extended or adjusted under 35 U.S.C. 154(b) by 21 days.

(21) Appl. No.: 18/974,064

(22) Filed: Dec. 9, 2024

(65) Prior Publication Data

US 2025/0314322 A1 Oct. 9, 2025

Related U.S. Application Data

(60) Provisional application No. 63/631,276, filed on Apr. 8, 2024.

(51) Int. Cl.
*F16K 27/12* (2006.01)

(52) U.S. Cl.
CPC .................................... *F16K 27/12* (2013.01)

(58) Field of Classification Search
CPC ...... F16K 27/12; Y10T 137/6988; E03C 1/28; E03F 5/0406; E03F 5/0417; E03F 5/0407; E04D 13/0409
See application file for complete search history.

(56) References Cited

U.S. PATENT DOCUMENTS 5,722,791 A * 3/1998 Dallmer .............. E04D 13/0409 405/36
6,276,093 B1 * 8/2001 Janesky .................... E03F 5/22 52/19
8,474,477 B1 * 7/2013 Melisz, Jr. .............. E02D 29/12 52/169.5

FOREIGN PATENT DOCUMENTS

GB 2475413 A * 5/2011 ................ E03F 5/04
KR 100645885 B1 * 11/2006 ............. F16K 31/18

OTHER PUBLICATIONS

Machine English translation of KR-100645885-B1 (Year: 2026).*

* cited by examiner

*Primary Examiner* — Hailey K. Do

(57) ABSTRACT

A backwater valve cover configured to prevent a backwater valve opening from releasing toxic soil gases into a home includes a base and a lid. The base is configured to be installed above a backwater valve. The base includes a central access opening, a first plurality of fastener holes configured to accept a first plurality of fasteners, and a second plurality of fastener holes configured to accept a second plurality of fasteners. The lid is configured to cover the central access opening and be fastened to the base via the second plurality of fasteners.

10 Claims, 15 Drawing Sheets

Section I-I

BACKWATER VALVE COVER SYSTEM

The present embodiments relate generally to backwater valve cover systems for residential plumbing. More specifically, the embodiments relate to a backwater valve cover system designed to prevent the infiltration of subterranean toxic soil gases, such as radon gas and mold caused from moisture, into a home.

BACKGROUND

Backwater (sometimes referred to as backflow) valve systems are commonly employed to prevent the reverse flow of wastewater into residential plumbing systems. While these systems effectively protect against liquid backwater, there remains a significant concern regarding the potential infiltration of toxic soil gases, such as radon gas and mold caused from moisture, into the home through the ground stone around the backwater valve.

Radon, a naturally occurring radioactive gas, poses serious health risks when it accumulates in enclosed spaces. Exposure to elevated levels of radon is known to be a leading cause of lung cancer, and it is imperative to implement measures that safeguard households from this silent yet hazardous threat.

Existing backwater valve covers often lack features specifically addressing the prevention and removal of toxic soil gases, leaving homes vulnerable to potential health hazards. There is, therefore, a need for an improved backwater valve cover system that not only prevents the ingress of toxic soil gases but also incorporates mechanisms for the safe expulsion of these gases to the exterior of the home.

SUMMARY OF THE INVENTION

The present invention addresses the shortcomings of existing backwater valve cover systems by providing a novel design that effectively prevents toxic gas infiltration into residential spaces. Additionally, the invention introduces a knock-out feature on the lid, enabling the attachment of a 3" coupler for connection to a radon removal system. This innovative combination ensures that the backwater valve cover system not only acts as a protective barrier but also actively contributes to the removal of subterranean gases, thereby enhancing the safety and well-being of individuals residing in the protected home.

The following detailed description of the invention, along with the accompanying drawings, will provide a more comprehensive understanding of the features and advantages of the novel backwater valve cover system with toxic gas prevention and removal capabilities.

In one embodiment, a backwater valve cover is disclosed including a base configured to be installed above a backwater valve and a lid. The base includes a central access opening, a first plurality of fastener holes configured to accept a first plurality of fasteners, and a second plurality of fastener holes configured to accept a second plurality of fasteners. The lid is configured to cover the central access opening and be fastened to the base via the second plurality of fasteners.

The first plurality of fastener holes may be distributed along an inner perimeter side of an outer edge of the base, and the first plurality of fasteners are configured to fasten the base to the floor surface such that the base is hermetically sealed against the floor surface.

The base may include a lip defining the central access opening, the lip having a lip planar surface offset from an outer planar surface of the base. The lip may include the second plurality of fastener holes. The second plurality of fastener holes may be distributed along an outer perimeter side of the central access opening.

A seal gap may exist between the lid and the base when the lid is fastened to the base. The seal gap is configured to receive a sealing gasket. Additionally, the lid may feature a cap designed to be knocked out, providing access to a 3" threaded area that enables the installation of a retrofit radon mitigation system in the future, should one choose to utilize this knockout feature.

These and other features and advantages will become apparent from the following detailed description of the presently preferred embodiment(s), taken in conjunction with the accompanying drawings.

BRIEF DESCRIPTION OF THE FIGURES

The drawings reference herein forms a part of the specification. Features shown in the drawings are meant as illustrative of only some embodiments, and not of all embodiments unless otherwise explicitly indicated.

DETAILED DESCRIPTION

Figure 1:
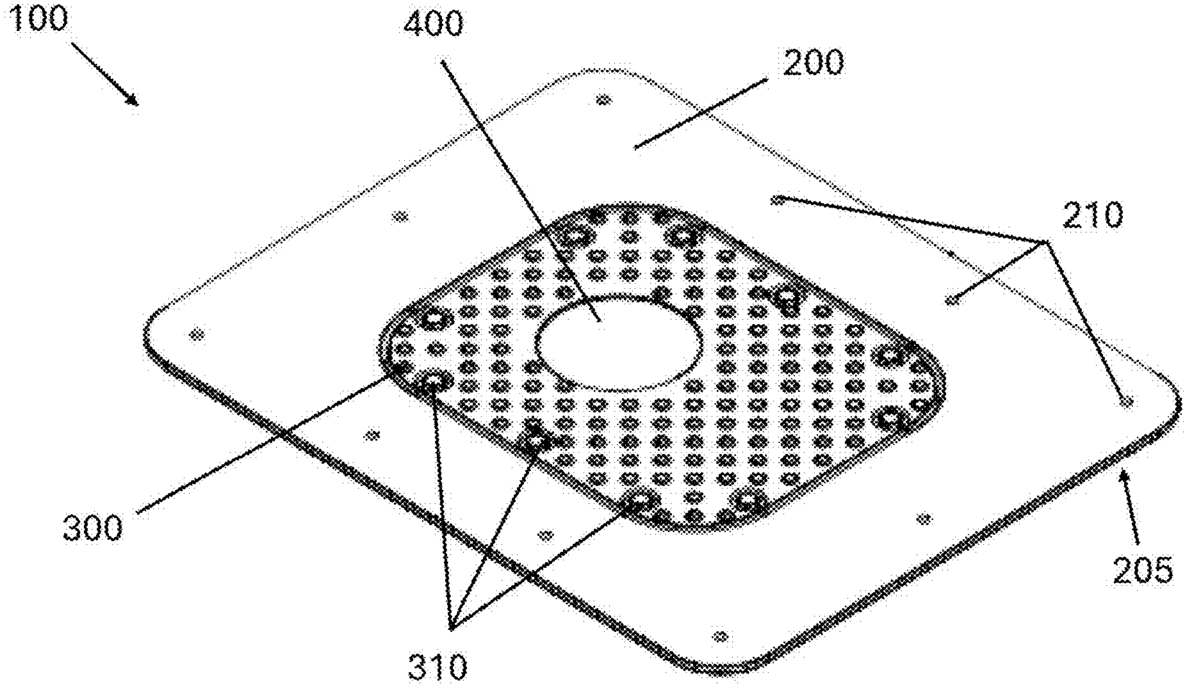
FIG. 1 depicts a perspective view of a backwater valve cover according to an embodiment of the invention.
Figure 2:
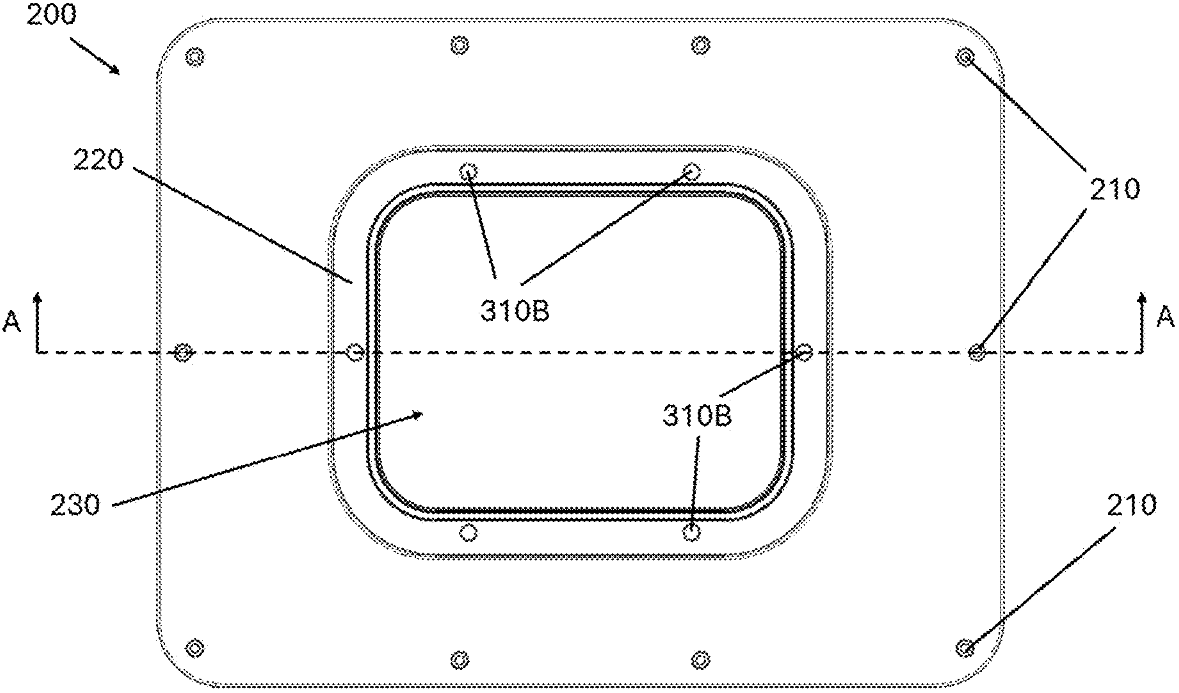
FIG. 2 depicts a top view of a base according to an embodiment of the invention.
Figure 3:
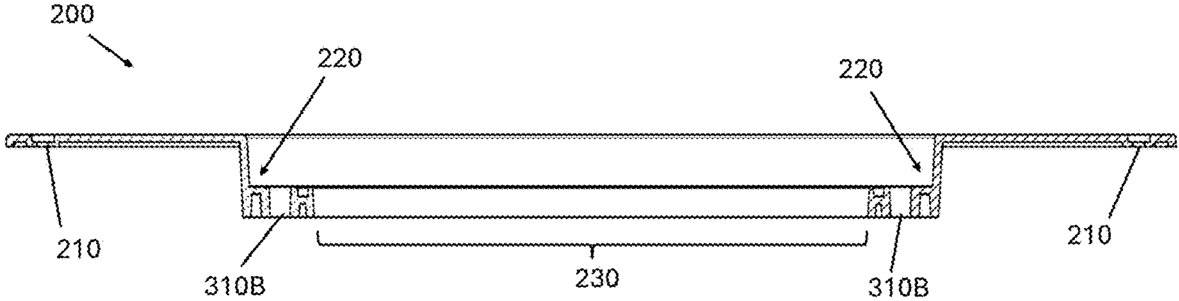
FIG. 3 depicts a cross-sectional side view of the base along Section A-A of FIG. 2 according to an embodiment of the invention.
Figure 4:
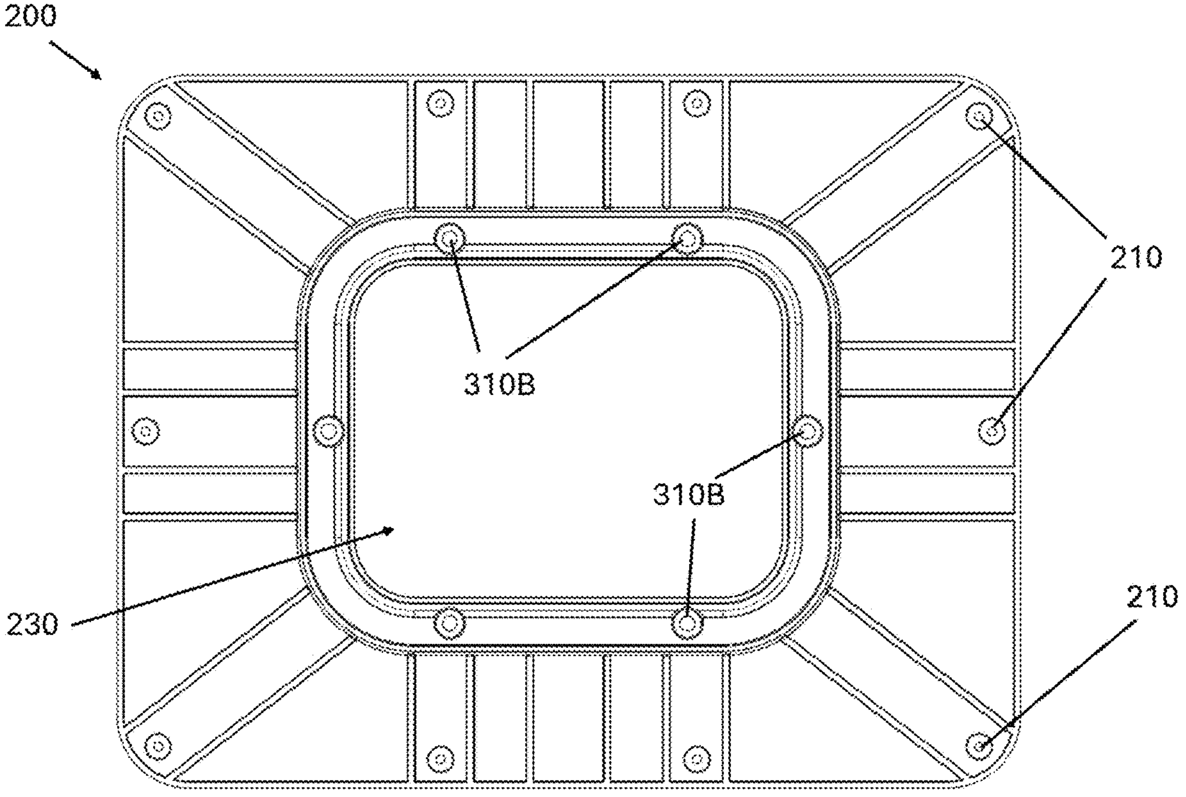
FIG. 4 depicts a bottom view of a base according to an embodiment of the invention.

It will be readily understood that the components of the present embodiment(s), as generally described and illustrated in the Figures herein, may be arranged and designed in a wide variety of different configurations. Thus, the following detailed description of the embodiments of the apparatus of the present embodiment(s), as presented in the Figures, is not intended to limit the scope of the embodiment(s), as claimed, but is merely representative of selected embodiments.

As depicted in FIGS. 1-4, 8 and 9, an embodiment of the invention is a backwater valve cover 100 includes a base 200 and a lid 300. The base 200 is configured to be installed above a backwater valve (not shown). The base 200 includes a central access opening 230, a first plurality of fastener holes 210 configured to accept a first plurality of fasteners (not shown), and a second plurality of fastener holes 310B configured to accept a second plurality of fasteners 310. The lid 300 is configured to cover the central access opening 230 and be fastened to the base 200 via the second plurality of fasteners 310.

The base 200 may be rectangular in shape and configured to sit on a floor surface. Corners of the base may be rounded to avoid catching with objects on the floor surface. The lid 300 may also be rectangular in shape and have rounded corners.

The first plurality of fastener holes 210 are distributed along an inner perimeter side of an outer edge of the base 200. The first plurality of fasteners are each configured to fasten the base 200 to the floor surface such that the base 200 is hermetically sealed against the floor surface.

The base 200 includes a lip 220 defining the central access opening 230, the lip 220 has a planar surface (lip planar surface at 220 shown in FIGS. 3 and 9) offset from an outer planar surface 222 of the base 200. The lip 220 includes the second plurality of fastener holes 310B, the second plurality of fastener holes 310B are distributed along an outer perimeter side of the central access opening 230.

Figure 10:
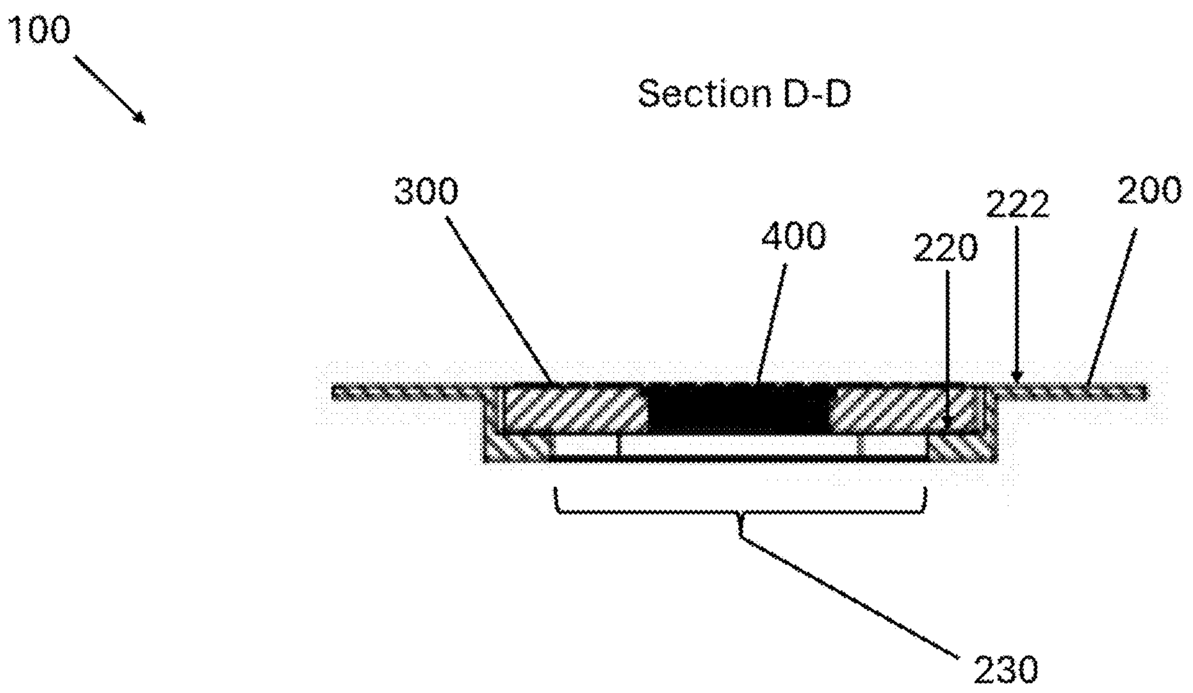
FIG. 10 depicts a cross-sectional view along Section D-D of FIG. 8 of a backwater valve cover according to an embodiment of the invention.
Figure 11:
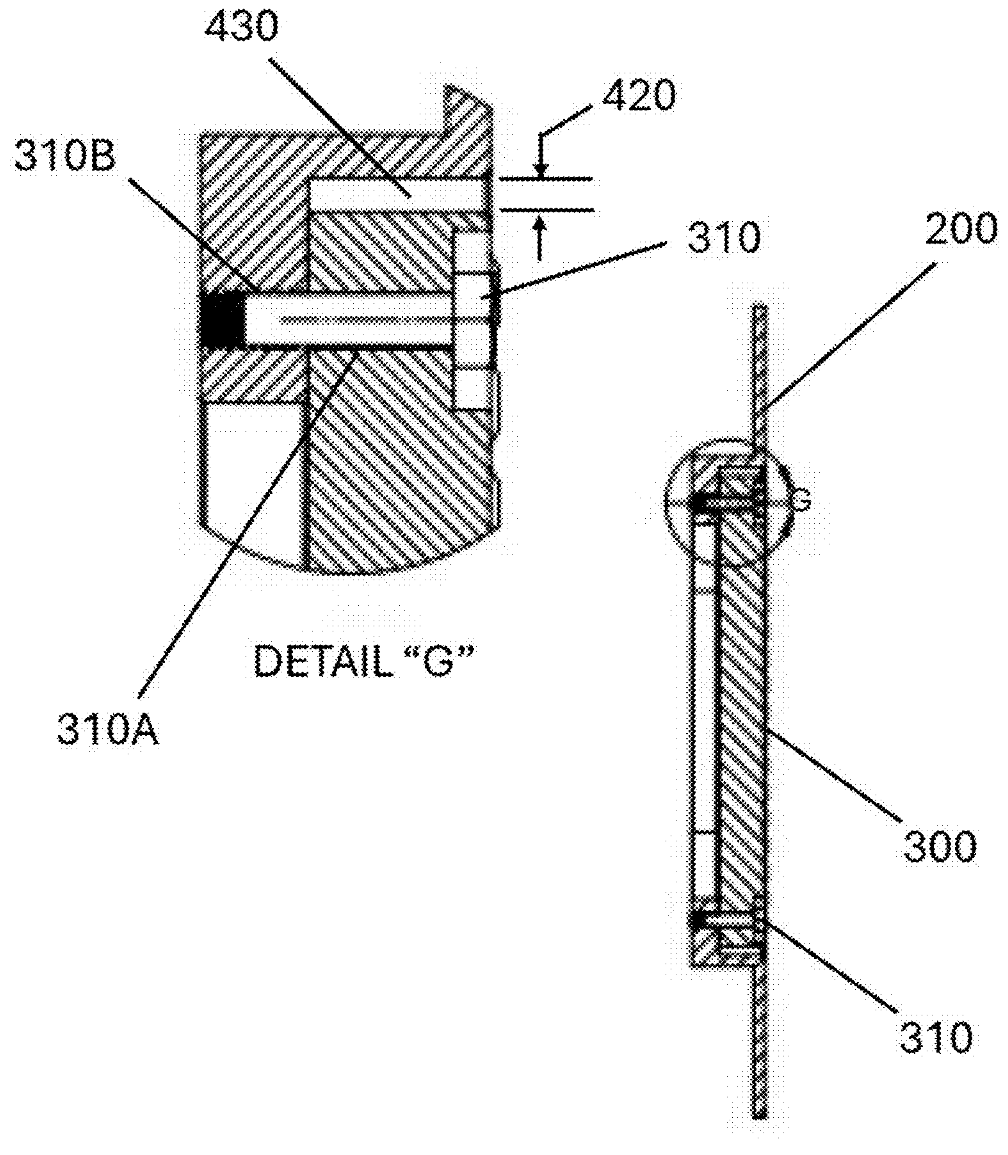
FIG. 11 depicts a cross-sectional view along Section E-E of FIG. 8 and a magnified view of Section G of the Section E-E cross section of a backwater valve cover according to an embodiment of the invention.
Figure 12:
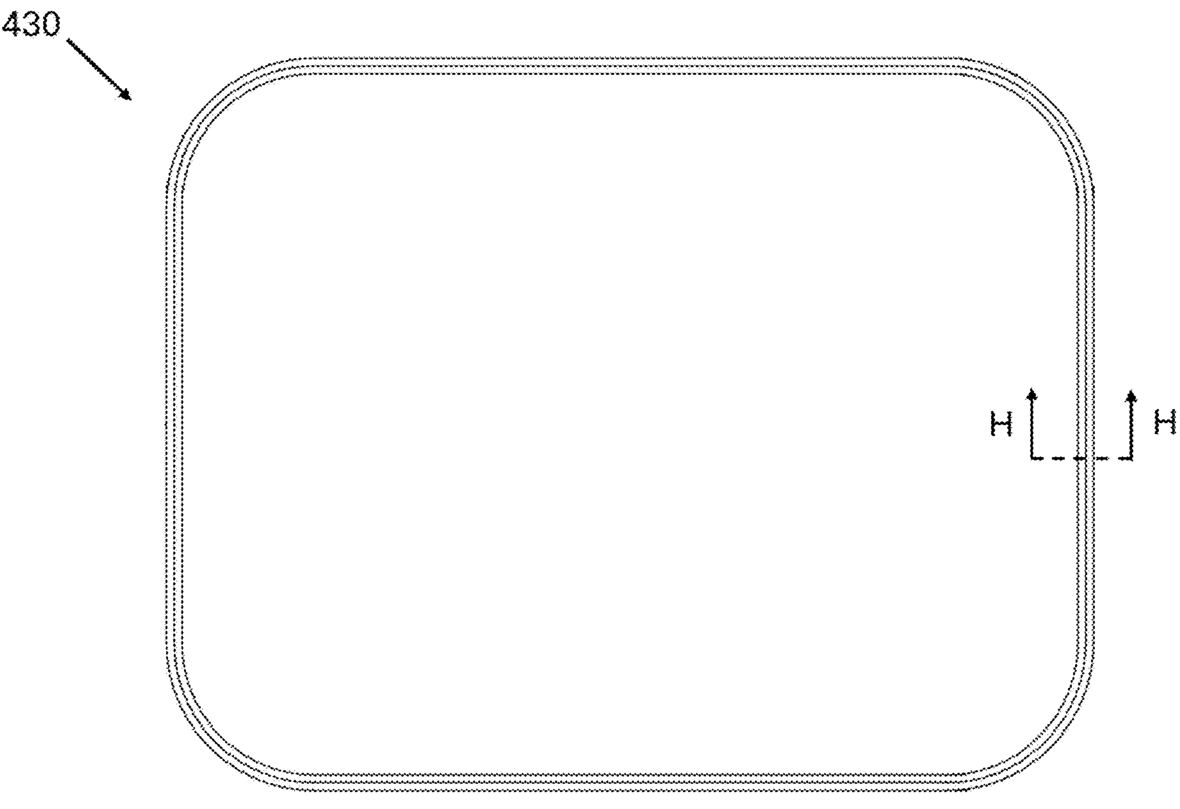
FIG. 12 depicts a top view of a seal according to an embodiment of the invention.

The second plurality of fasteners 310 are configured to hermetically seal the lid 300 to the base 200. A thickness of the lid 300 is equal to the offset of the lip planar surface (surface at 220 shown in FIGS. 3 and 9) such that an outer surface of the lid 300 is flush with the outer planar surface of the base 200 when the lid 300 is fastened to the base 200. As shown in FIGS. 10 and 11, a seal gap 420 exists between the lid 300 and the base 200 when the lid 300 is fastened to the base 200, the seal gap 420 being configured to receive a sealing gasket 430 (also referred herein as a seal).

Figure 13:
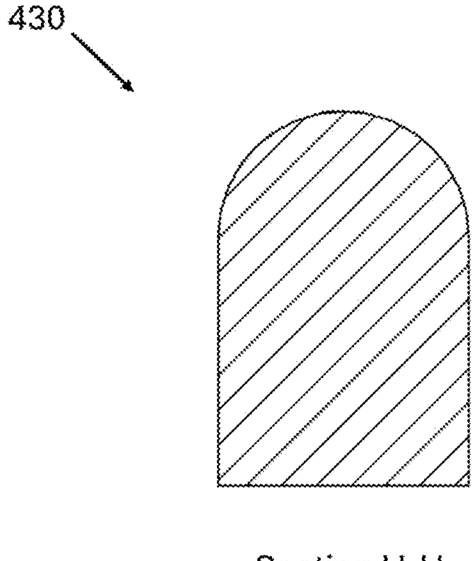
FIG. 13 depicts a cross-sectional view along Section H-H of FIG. 12 of a seal according to an embodiment of the invention.

As shown in FIGS. 10-13, the seal 430 is shaped to fit around the outer perimeter of the lid 300 when it sits on the lip planar surface 220. The seal 430 may have a cross section with a flat bottom and flat sides so that a water-tight or air-tight seal is made between the seal 430, the lid 300 and the base 200. As shown in FIG. 13, the top of the seal 430 may be rounded to facilitate installation of the lid 300.

Figure 5:
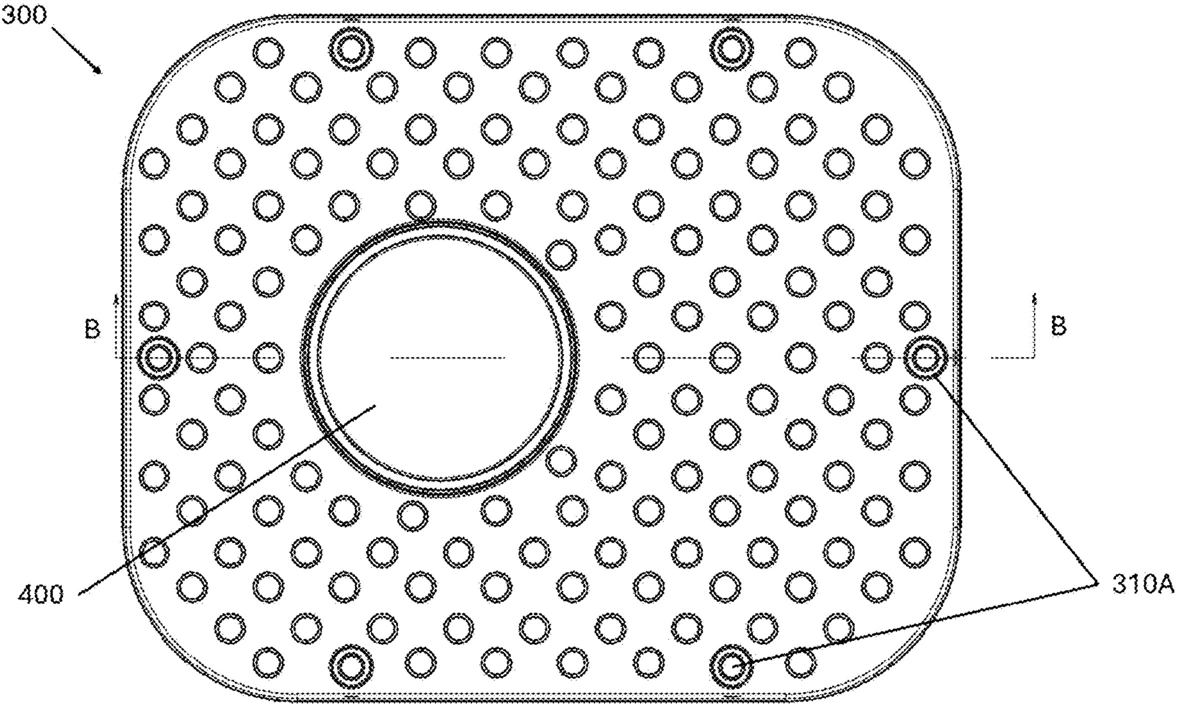
FIG. 5 depicts a top view of a lid according to an embodiment of the invention.
Figure 6:
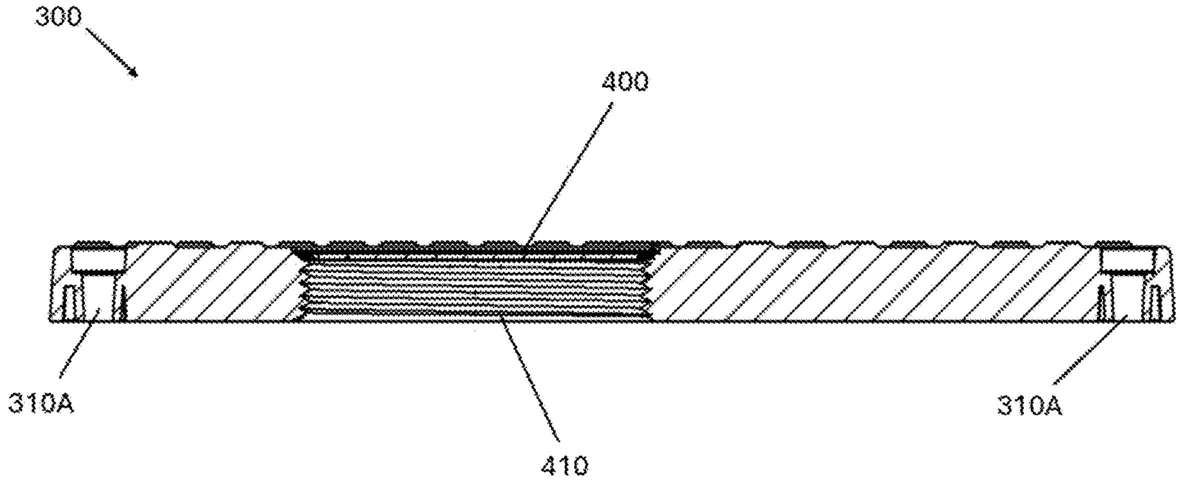
FIG. 6 depicts a cross-sectional side view of the lid along Section B-B of FIG. 5 according to an embodiment of the invention.
Figure 7:
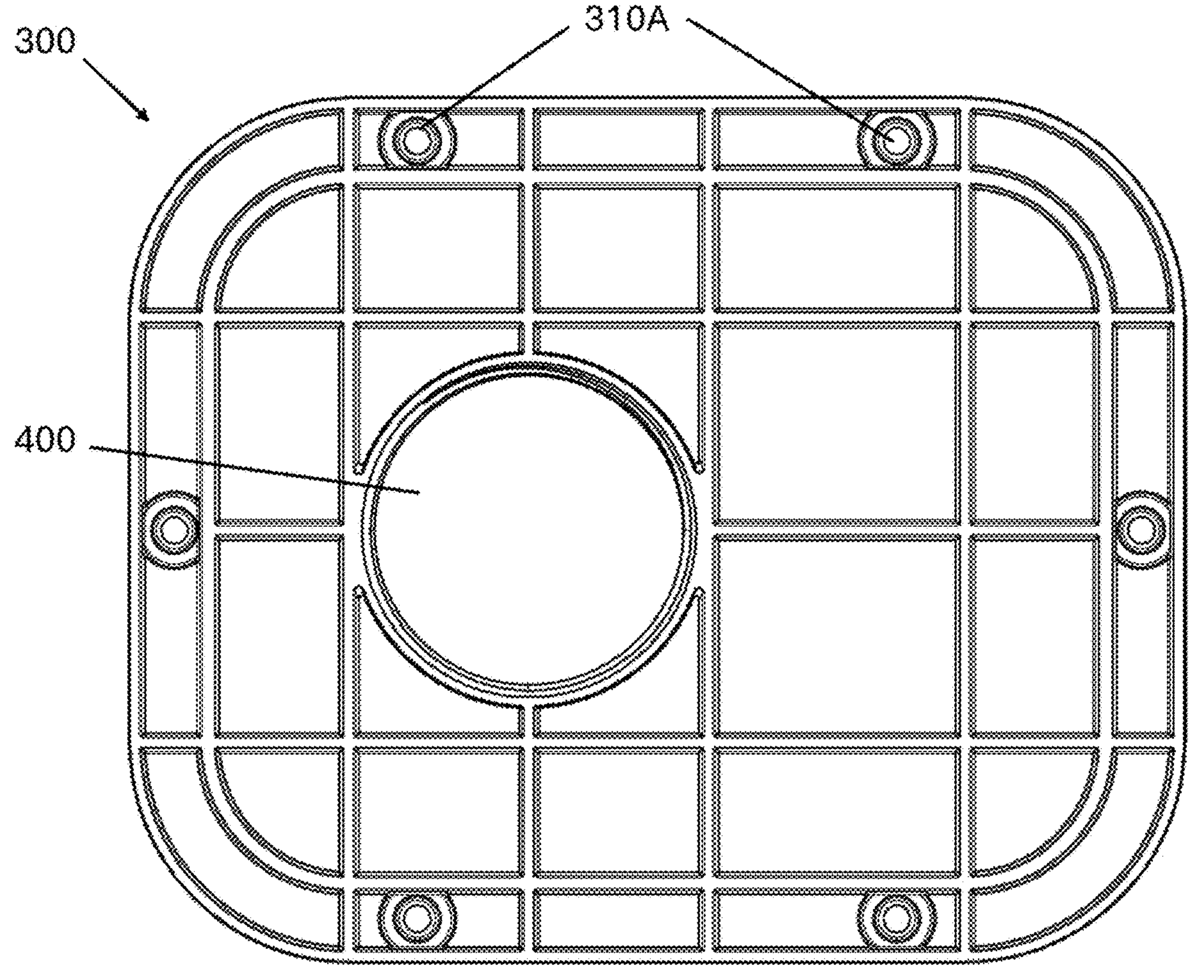
FIG. 7 depicts a bottom view of a lid according to an embodiment of the invention.
Figure 8:
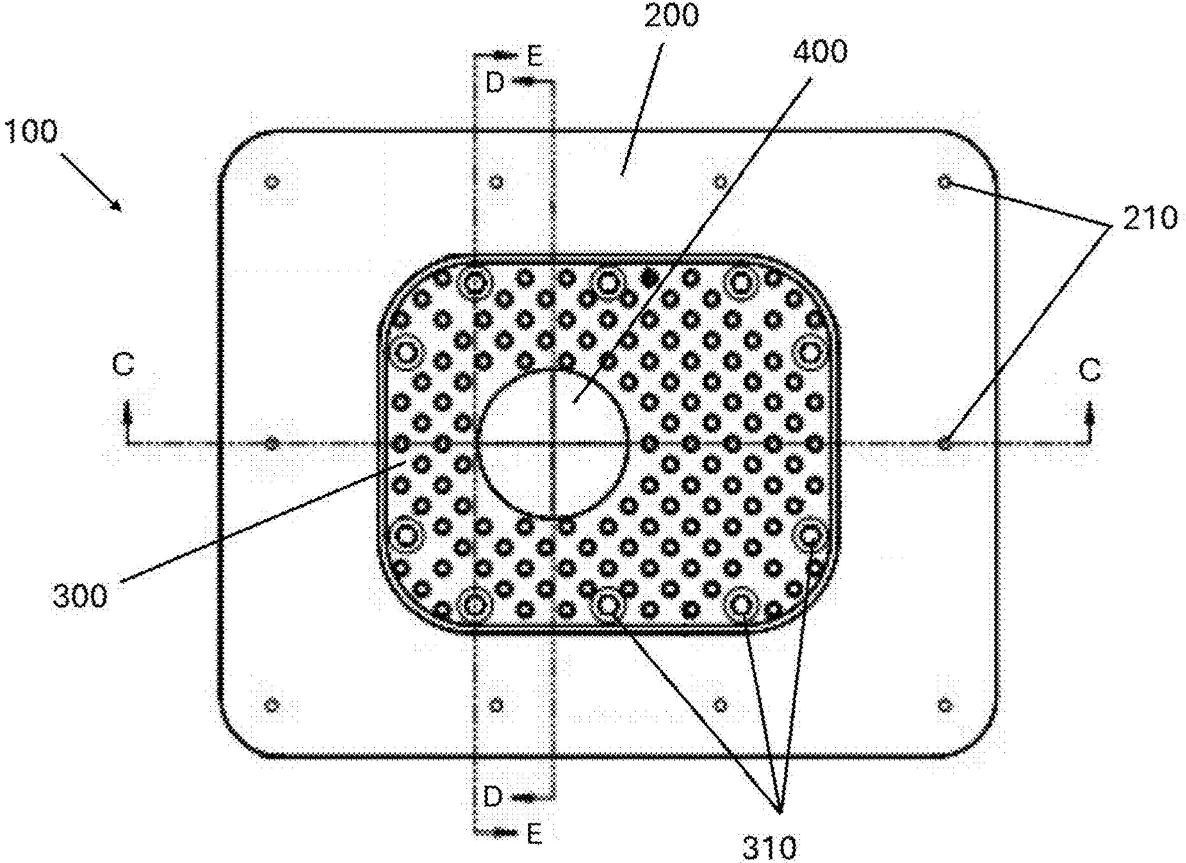
FIG. 8 depicts a top view of a backwater valve cover according to an embodiment of the invention.
Figure 9:
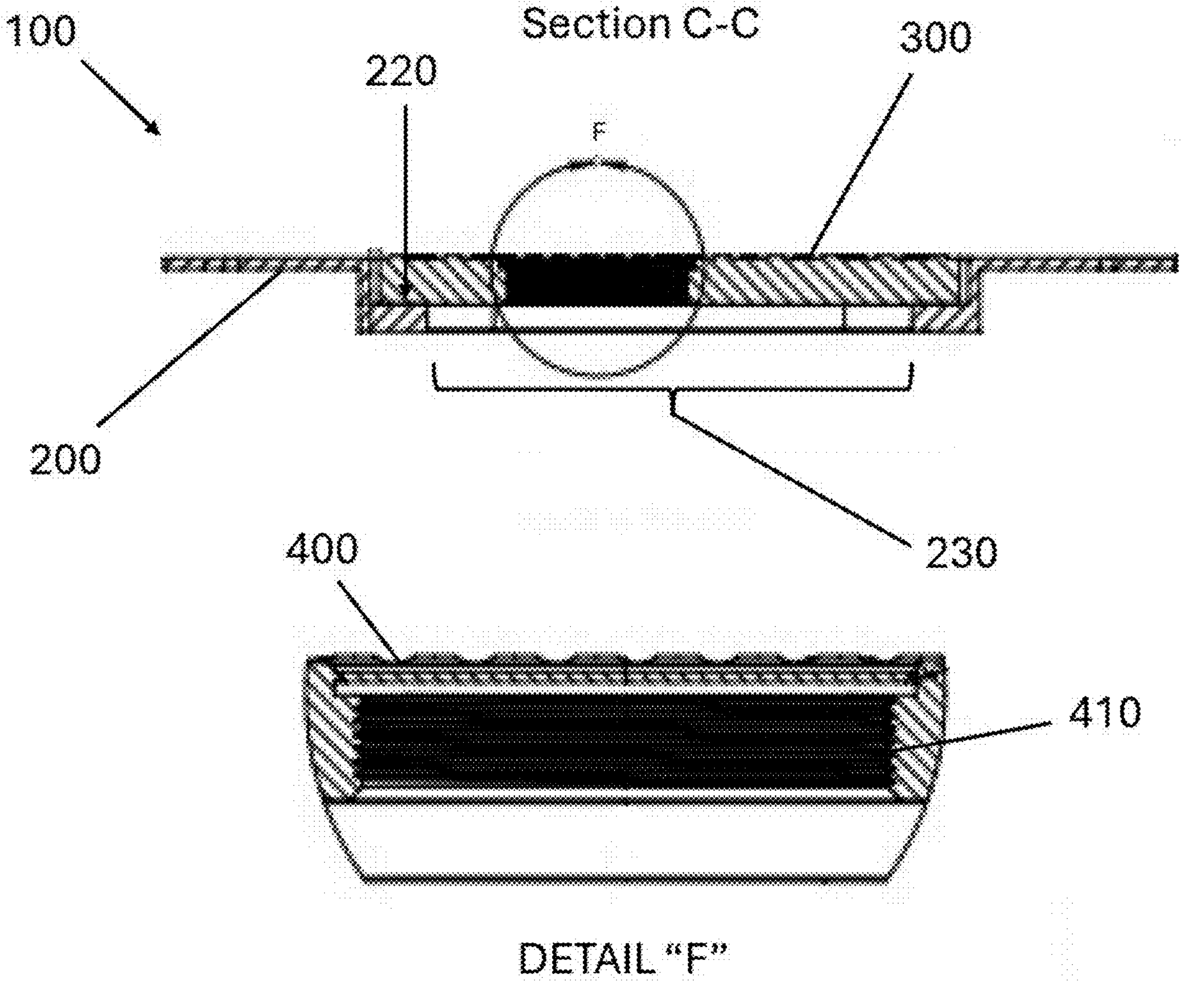
FIG. 9 depicts a cross-sectional view along Section C-C of FIG. 8 and a magnified view of Section F of the Section C-C cross section of a backwater valve cover according to an embodiment of the invention.

Details of the lid 300 are shown in FIGS. 5-7. The lid 300 includes a cap 400 configured to act as a "knock-out feature," providing access through-hole access to a backwater valve covered by the lid 300. A "knock-out feature," as used herein, is a feature that can be removed by impact with an instrument (such as a hammer) or easily cut open. Specifically, the cap 400 is integrally formed with the lid 300 to be a single piece. However, material holding the cap 400 in place with respect to the lid 300 is thinner, and thereby weaker, than in the remainder of the lid 400. As such, a weak point is built into the lid 300 facilitating the separation and removal of the cap 400. The portion 410 of the lid 300 underneath the cap 400 is threaded. Knocking out the cap 400 from the lid 300 reveals the threaded portion 410 underneath the cap 400, thereby enabling the attachment of a coupler (not shown) for connection to a radon removal system (not shown). This combination ensures that the backwater valve cover system not only acts as a protective barrier but can also be adapted to contribute to the removal of subterranean gases, thereby enhancing the safety and well-being of individuals residing in the protected home.

The second plurality of fasteners 310 are bolts configured to pass through the lid 300 and thread into the base 200 via the plurality of fastener holes 310A of the lid 300 and the second plurality of fastener holes 310B of the base 200.

The present invention addresses the shortcomings of existing backwater valve cover systems by providing a design that effectively prevents toxic gas infiltration into residential spaces. In some embodiments, the backwater valve cover 100 may include a seal 430 positioned between the lid 300 and the base 200 to ensure a gas-tight seal and prevent toxic gas intrusion into the home. In some embodiments, the lid 300 and base 200 may be formed from a polymer material, contributing to the durability and effectiveness of the system in preventing toxic gas infiltration.

The separate nature of the lid 300 from the base 200 facilitates access to the backwater valve, simplifying inspection and maintenance procedures without compromising the cover's effectiveness in preventing toxic gas infiltration. In some embodiments, the lid 300 and base 200 may be configured for snap-fit engagement instead of being connected via fasteners 310. In a further embodiment, the engagement of the lid 300 to the base 200 may be via latches or screws.

Figure 14:
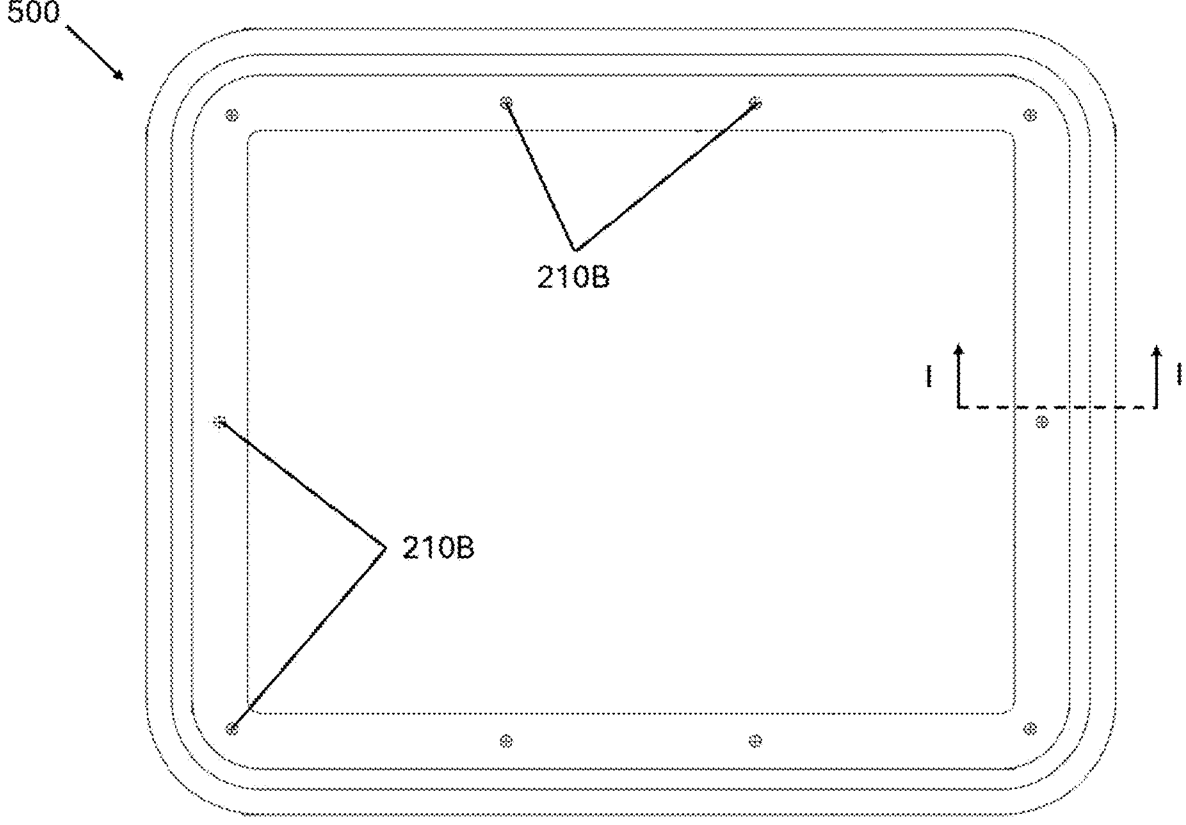
FIG. 14 depicts a top view of a gasket according to an embodiment of the invention.
Figure 15:
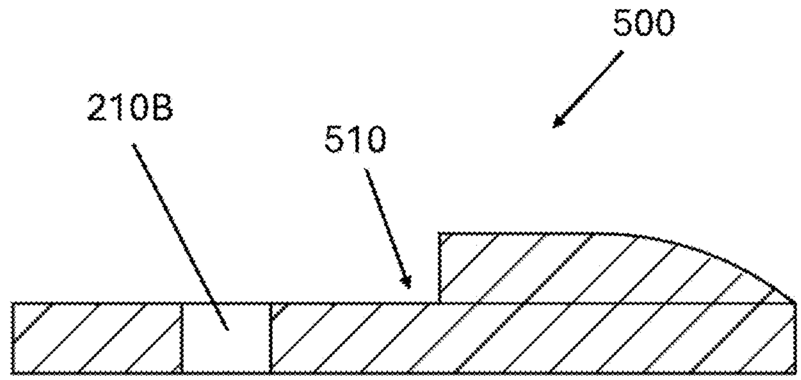
FIG. 15 depicts a cross-sectional view along Section I-I of FIG. 14 of a gasket according to an embodiment of the invention.

Referring to FIGS. 14 and 15, a base gasket 500 may also be included as part of the backwater valve cover 100. The base gasket 500 (also referred herein as the gasket) is a gasket that contributes in making a hermetic seal between the base 200 and the floor surface. The gasket 500 is configured to be positioned between the base 200 and the floor surface. As such, the gasket 500 has a lip section 510 configured to receive the base 200 thereupon. In addition, the gasket 500 has a plurality of fastener holes 210B that are configured to be aligned with the first plurality of fastener holes 210 to receive the first plurality of fasteners.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiment(s) has been presented for purposes of illustration and description, but is not intended to be exhaustive or limited to the embodiment(s) in the form disclosed. Many modifications and variations will be apparent to those of ordinary skill in the art without departing from the scope and spirit of the embodiment(s). The embodiment was chosen and described in order to best explain the principles and the practical application, and to enable others of ordinary skill in the art to understand the embodiment(s) for various embodiments with various modifications as are suited to the particular use contemplated.

It will be appreciated that, although specific embodiments have been described herein for purposes of illustration, various modifications may be made without departing from the spirit and scope of the invention. Accordingly, the scope of protection of this invention is limited only by the following claims and their equivalents.

We claim:

1. A backwater valve cover comprising:

a base configured to be installed above a backwater valve, the base including:

a central access opening, a first plurality of fastener holes configured to accept a first plurality of fasteners, and a second plurality of fastener holes configured to accept a second plurality of fasteners; and a lid configured to cover the central access opening and be fastened to the base via the second plurality of fasteners, the lid including:

a cap configured to be knocked out and provide access to a backwater valve covered by the backwater valve cover, and a threaded portion beneath the cap.

2. The backwater valve cover according to claim 1, wherein the second plurality of fasteners are bolts configured to pass through the lid and thread into the base via the second plurality of fastener holes.

3. The backwater valve cover according to claim 1, wherein:

the base is rectangular in shape and is configured to sit on a floor surface, and the lid is rectangular in shape.

4. The backwater valve cover according to claim 3, further comprising the first plurality of fasteners, wherein:

the first plurality of fastener holes are distributed along an inner perimeter side of an outer edge of the base, and the first plurality of fasteners are configured to fasten the base to the floor surface such that the base is hermetically sealed against the floor surface.

5. The backwater valve cover according to claim 3, further comprising a gasket configured to be positioned between the base and the floor surface.

6. The backwater valve cover according to claim 1, wherein the base includes a lip defining the central access opening, the lip having a lip planar surface offset from an outer planar surface of the base.

7. The backwater valve cover according to claim 6, wherein a thickness of the lid is equal to the offset of the lip planar surface such that an outer surface of the lid is flush with the outer planar surface of the base when the lid is fastened to the base.

8. The backwater valve cover according to claim 6, wherein a seal gap exists between the lid and the base when the lid is fastened to the base, the seal gap being configured to receive a sealing gasket.

9. The backwater valve cover according to claim 6, wherein the lip includes the second plurality of fastener holes, the second plurality of fastener holes being distributed along an outer perimeter side of the central access opening.

10. The backwater valve cover according to claim 9, further comprising the second plurality of fasteners, wherein the second plurality of fasteners are configured to hermetically seal the lid to the base.

* * * * *